United States Patent [19]

Humblot

[11] Patent Number: 4,544,821
[45] Date of Patent: Oct. 1, 1985

[54] WELDING APPARATUS USING TRANSFORMER WITH MOVABLE SECONDARY AND ITS METHOD OF MANUFACTURE AND USE

[76] Inventor: Bernard Humblot, 22, Chemin du Parc, 78580 Bazemont, France

[21] Appl. No.: 369,793

[22] Filed: Apr. 19, 1982

[30] Foreign Application Priority Data

May 12, 1981 [FR] France ............................... 81 09404

[51] Int. Cl.⁴ .................. B23K 11/10; H01F 21/04
[52] U.S. Cl. .................... 219/91.2; 219/89; 219/116; 336/118
[58] Field of Search ................ 219/116, 89, 91.2; 336/117, 118, 119, 120, 121, 122, 123, 125, 129

[56] References Cited

U.S. PATENT DOCUMENTS

| | | | |
|---|---|---|---|
| 2,519,784 | 8/1950 | Oesterlein | 336/129 |
| 3,663,790 | 5/1972 | Humblot | 219/86 |
| 3,743,816 | 7/1973 | Sato | 219/116 |
| 4,179,796 | 12/1979 | Allen | 29/605 |
| 4,233,488 | 11/1980 | Schwartz | 219/116 |
| 4,352,971 | 10/1982 | Slade | 219/89 |

FOREIGN PATENT DOCUMENTS 2555989 7/1975 France .
2380841 9/1978 France .

*Primary Examiner*—Roy N. Envall, Jr.
*Assistant Examiner*—Alfred S. Keve
*Attorney, Agent, or Firm*—Sandler & Greenblum

[57] ABSTRACT

A welding apparatus includes an improved transformer having a U-shaped secondary winding movable therein and guided by means external to the transformer. One leg of the U-shaped winding is flexibly connected to a first welding electrode carried by the piston rod of a jack having a jack body and piston adapted for movement relative to one another. The other leg of the winding is rigidly connected to a second welding electrode which is also rigidly secured to the jack body. The jack is movably mounted on guide means external to the transformer. Thus, as the second electrode is moved during a welding operation, the secondary winding is guided within the transformer by the movement thereof.

A method of welding includes moving the first electrode toward a workpiece so as to contact the same and thereafter moving the second electrode to clamp the workpiece for welding, the secondary winding being guided by the movement of the second electrode.

A transformer and the method of manufacturing the transformer wherein a primary winding and magnetic circuit are positioned within a casing having open ends. Bars, carrying tubular conduits, are also positioned within the casing and the end plates are provided to close the ends of the casing. A binding agent is poured into the casing to fill all the free spaces defined by the end plates and to assemble the transformer. The bars are removed after the binding agent has set to form free spaces which serve to accommodate a movable secondary winding.

20 Claims, 9 Drawing Figures

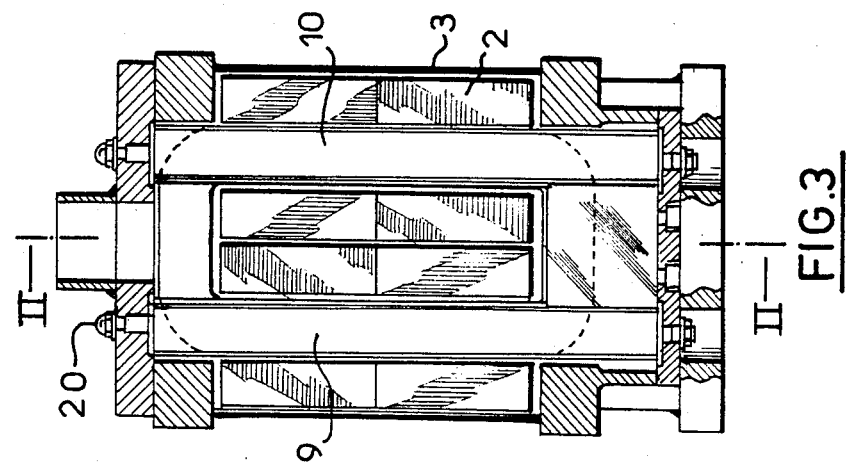
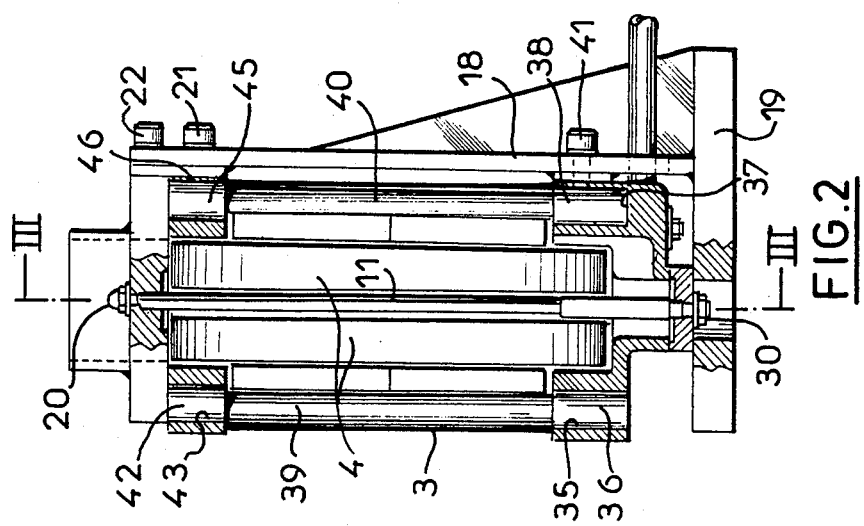

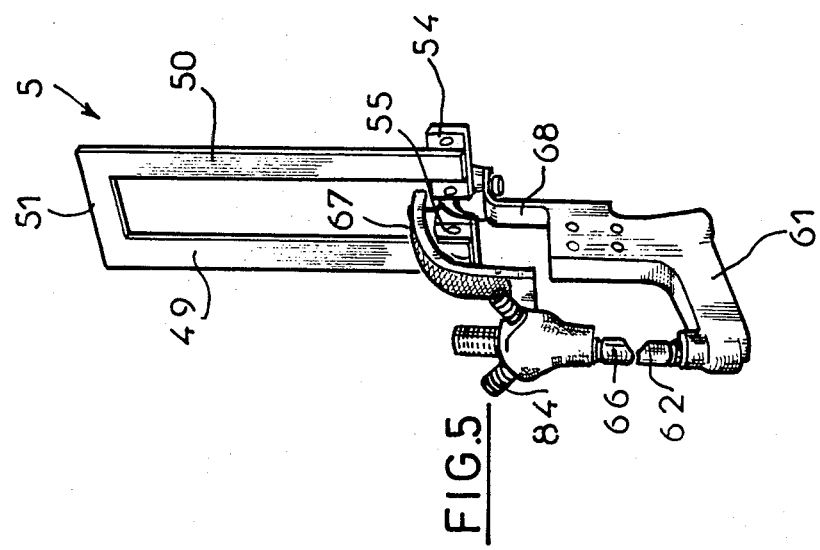
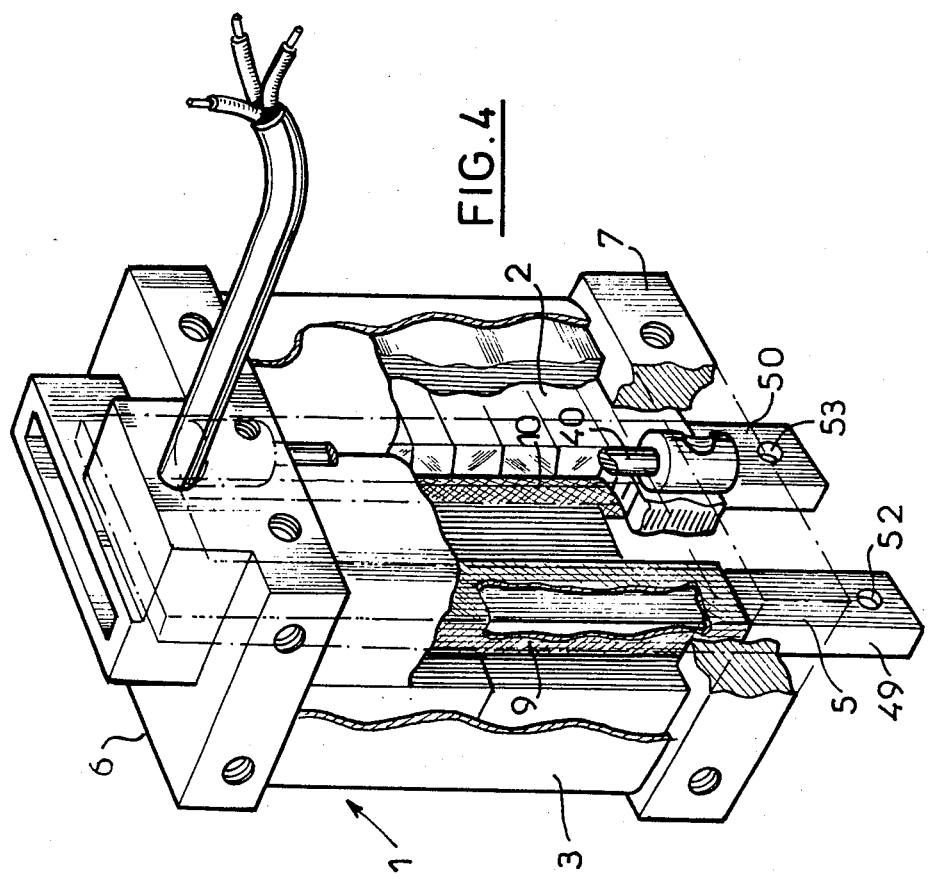

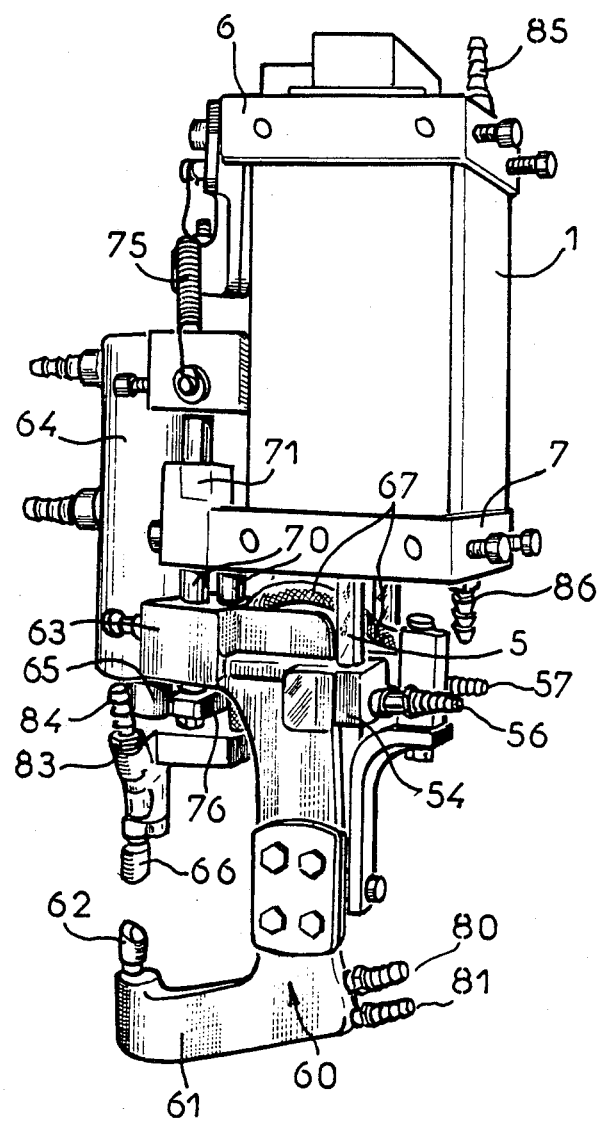

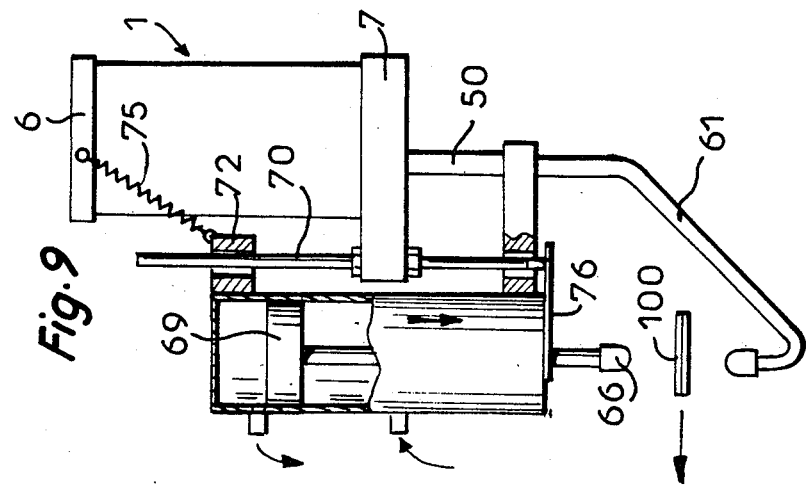
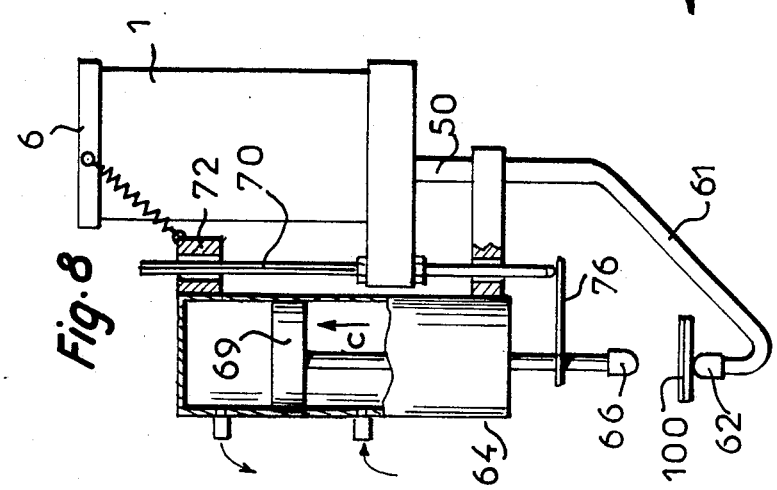
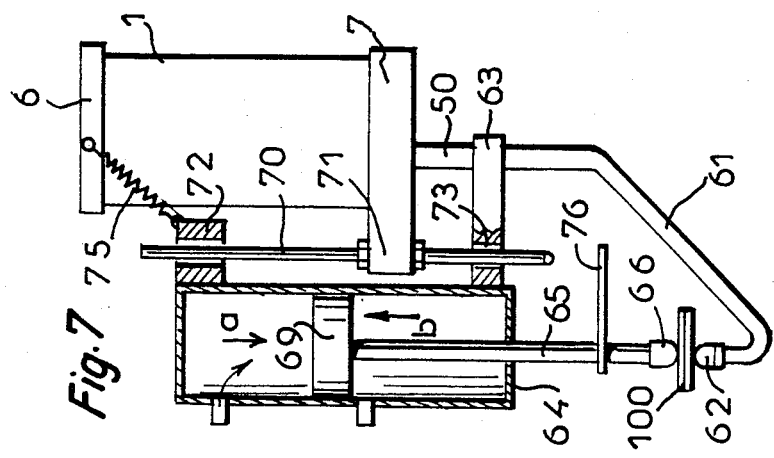

WELDING APPARATUS USING TRANSFORMER WITH MOVABLE SECONDARY AND ITS METHOD OF MANUFACTURE AND USE

BACKGROUND OF THE INVENTION

1. Field of Invention

The present invention generally relates to an electric resistance welding apparatus and method of manufacture, and more particularly to a welding apparatus having a transformer of improved construction.

2. Discussion of Prior Art

Resistance welding machines of the type concerned typically employ a frame for fixedly supporting the laminated magnetic circuit of a transformer having two primary winding coils and a secondary circuit connected to the welding electrodes of the machine. Because the welding electrodes are movably mounted to permit a workpiece to be clamped therebetween and the secondary circuit is fixed relative to the primary by the frame, each electrode is connected to the secondary circuit by a secondary shunt circuit made of flexible braids. These braids of the shunt circuit are subject to considerable fatigue during repeated welding operations and must be periodically replaced. Additionally, this secondary shunt circuit has a length which detrimentally adds to the overall impedance of the transformer.

In French Pat. No. 69 16 670, filed Jan. 22, 1969, the Applicant of the present invention proposed an electric welding apparatus of improved construction which reduces the impedance contribution of the secondary circuit by employing a transformer having a secondary circuit which is movable, with the welding electrodes, relative to a primary circuit adapted for connection to an alternating current source. The secondary winding of the secondary circuit is formed from a pair of parallel rods movably mounted inside of the transformer and electrically interconnected at one end by a flexible braid. The free end of each rod is connected to a welding electrode in such a fashion so as to form, together with the workpiece to be welded, the secondary circuit of the transformer.

This type of transformer construction, in a welding apparatus, offers a large number of advantages in that the secondary circuit is in direct contact with the workpiece thus reducing the impedance of the secondary circuit and providing direct welding. The secondary circuit is also reduced to its simplest form, being limited to the movable rods, which do not belong to the magnetic circuit of the transformer, and the corresponding portion of the workpiece which is clamped between the electrodes during welding. Moreover, the external secondary circuit has a constant impedance over any given time period and since this secondary circuit is in direct contact with the workpiece, the transformer can be constructed with smaller dimensions and a correspondingly lower power requirement, thus providing a savings in energy resulting in a reduction in the cost of operation.

While the transformer described above provides many advantages, the design is not particularly adapted for use with automatic welding apparatus and industrial robot manipulators where engineering efforts are directed to reducing the complexity, weight and overall size of the welding equipment.

Furthermore, in the construction of the transformer described by the above-noted French Patent, the secondary circuit is formed by two separate parallel rods each guided individually inside of the transformer and interconnected by means of a flexible shunt. As a result, the transformer must be dismantled for maintenance and a relatively complicated guiding structure must be provided for each individual rod, thus increasing the cost, complexity and overall weight of the welding apparatus.

SUMMARY OF THE INVENTION

It is thus an aim of the present invention to provide a welding apparatus and method of manufacture which obviates the various drawbacks noted above.

In accordance with the principles of the present invention, there is provided a welding apparatus having a transformer including primary and secondary windings, the secondary winding being movable within the transformer. A first welding electrode is flexibly connected to a first electrical terminal of the secondary winding and a second welding electrode is rigidly connected to a second electrical terminal of the secondary winding. A secondary winding guide means, external to the transformer and connected to the secondary winding, guides the secondary winding during a welding operation.

The secondary winding guide means includes a floating jack of the type having a jack body and piston movable relative to one another. This jack is movably mounted on jack guide means situated external to the transformer. By rigidly connecting the second electrode to the jack body and connecting the first electrode to a piston rod of the jack piston, the secondary winding is accurately guided in the transformer during a welding operation without the need for an internal guiding arrangement.

The welding apparatus according to the present invention employs a secondary winding formed from a bar having a generally U-shaped configuration which presents first and second legs or limbs to which are attached, respectively, the first and second welding electrodes of the machine.

According to the present invention, the apparatus utilizes jack guide means having a pair of guide rods positioned parallel to each other as well as to the legs of the secondary winding, the rods being integral with and external to the transformer, and the jack body being mounted so as to slide on these rods.

A stop, carried by the piston rod, is adapted to abut the bottom of the guide rods and serves to limit the movement of the first electrode when the first electrode is moved away from a workpiece after welding to thereby enable the jack body to slide along the guide rods thus causing the second electrode, supported by the jack body, to move away from the workpiece.

The present invention further provides a method of welding with a welding apparatus including a first electrode, flexible connected to one leg of a U-shaped secondary winding movably mounted within a transformer and a second electrode, rigidly connected to the other leg of the U-shaped secondary winding. The first electrode is moved toward a workpiece as to contact the same. Thereafter, the second electrode is moved toward the workpiece so as to clamp the same between the electrodes. The weld is effected and after the first electrode is moved away from the workpiece, the second electrode moves away from the workpiece so that the secondary winding, within the transformer is guided with the movement of the secondary electrode without the need for secondary winding guide means within the transformer.

According to another aspect of the invention, a method of manufacturing a transformer is provided comprising the steps of positioning a magnetic circuit and a pair of primary windings within a casing having an open top and bottom. A pair of parallel bars, each carrying a tubular element, is placed in proximity to the primary windings, and end plates are fitted to the top and bottom of the casing after the bars have been placed in position. The bars are affixed to an assembly frame to maintain the component parts of the transformer in proper position and a binding agent is powed into the casing to fill up all free spaces defined by the plates. The transformer is then removed from the assembly frame after the binding agent has set and thereafter the flat bars are removed to provide two parallel channels of flat rectangular cross-section for accommodating a secondary winding.

In the method according to the present invention one of the end plates is formed with an aperture for accommodating the insertion and removal of the secondary windings.

Each end plate may be formed with blind holes extending at an angle to the longitudinal axis of the transformer whereby the binding agent poured into the casing fills the blind holes thus allowing the resin to firmly secure the end plates in place.

The invention further extends to the transformer itself, including a primary winding and a magnetic circuit positioned with a casing closed on either end by end plates. A free space is formed within the transformer for accommodating the legs of a U-shaped secondary winding which is adapted for movement within the transformer. The parts of the transformer are permanently bonded together by a binding agent and one of the end plates is provided with an aperture for permitting the insertion and removal of the secondary winding.

These and other objects, features and advantages of the invention will be apparent as the following description proceeds with particular reference to the annexed drawings.

BRIEF DESCRIPTION OF THE APPLICATION DRAWINGS

FIG. 2 is a sectional side view of the transformer taken along line III—III of FIG. 3;

FIG. 3 is a front sectional view of the transformer taken along line II—II of FIG. 2;

FIG. 4 is a perspective view, partially in section, illustrating the individual elements of the transformer;

FIG. 5 is a perspective view illustrating the secondary circuit according to the present invention;

FIG. 6 is a perspective view illustrating the apparatus of the present invention; and FIGS. 7-9 schematically illustrate the operation of the welding apparatus of the present invention.

DETAILED DESCRIPTION OF THE PREFERRED EMBODIMENTS

Figure 1:
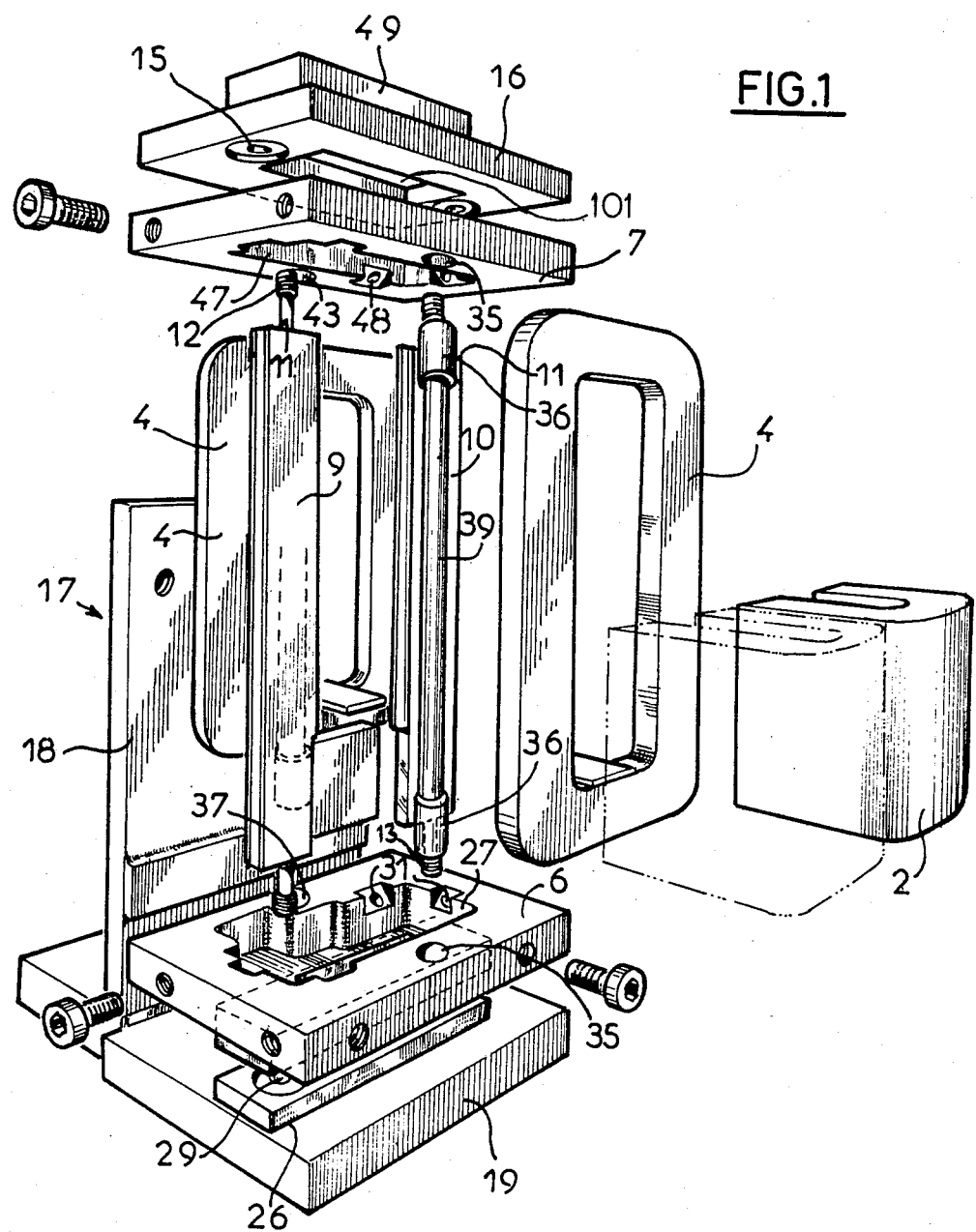
FIG. 1 is an exploded view, in perspective, illustrating the transformer of the present invention during the course of production.

The apparatus to which the invention relates is of the type comprising a transformer having a primary winding adapted for connection to a suitable source of alternating current, and a secondary winding consisting of a single turn which is movable inside of the transformer. The apparatus employs a control jack of the floating type which is arranged so that the body of the jack is movable in relation to the piston and vice versa. The jack body supports one welding electrode and the piston rod of the jack is adapted to support the other electrode in such a way so as to affect welding points of the type known as direct, i.e., the workpieces are clamped between the electrodes, each electrode being electrically connected to the secondary winding.

The secondary winding is constructed from a bar which is U-shaped in order to present two limbs or legs, the end of one limb being connected by a flexible shunt to the electrode carried by the piston rod while the other end of the remaining limb is rigidly connected the other electrode which is attached to and insulated from the body of the jack.

This arrangement eliminates the necessity for providing means for guiding the secondary circuit inside of the transformer since the jack is guided on a frame external to the transformer, and the secondary circuit, inside of the transformer, is attached to the elements of the jack. Friction and wear are thus considerably reduced. Furthermore, since the movable components are situated externally to the transformer, maintenance work can be performed without the necessity of dismantling the entire apparatus.

According to one particular embodiment of the present invention, the secondary winding comprises a flat bar of generally rectangular cross-section. Use can thus be made of a simple bar of electrolytic copper of rectangular section, which can be simply and cheaply produced and enables better electric coupling to be obtained between the primary and secondary circuits of the transformer.

In order to construct the transformer of the present invention, two primary windings and a laminated magnetic circuit are positioned between a pair of end plates such that a casing, extending between the end plates, clamps the magnetic circuit and the primary windings within the case. Thereafter, a binding agent is poured into the casing in order to fill up the free spaces in the casing and assemble the individual elements as well as to provide electrical insulation. The weight and size of the overall welding apparatus can thus be considerably reduced.

The transformer preferably includes tubular conduits positioned inside the transformer serving to form a free space adapted to accommodate the movable secondary circuit of the transformer.

The invention also relates to a method for manufacturing a transformer for use in a welding unit according to the invention, the method including the steps of positioning the primary windings, the laminated magnetic circuit to be accommodated between the windings and a pair of bars of flat rectangular cross-section in a casing which can be tubular in shape. Thereafter, tubular insulating conduits, adapted to accommodate the movable secondary circuit, are placed onto the bars and the entire combination is then clamped into an assembly frame. A binding agent, such as an epoxy resin, is poured into the tubular case to fix the individual elements of the transformer in spacial relationship. The assembly is then removed from the assembly frame and the flat bars are withdrawn from the casing once the binding agent has set, thereby forming channels which serve to accommodate the secondary winding. At least one of the end plates of the assembly is provided with an aperture to enable the flat bars to be extracted and the secondary winding to be placed in position.

A further feature of the present invention relates to the simple, efficient and inexpensive operation of mounting the jack on the transformer. According to this feature, the apparatus comprises two guide rods positioned external to the transformer and arranged parallel to one another as well as to the limbs of the secondary winding. These guide rods are integral with a fixed frame of the transformer, the body of the jack being mounted in such a manner so as to slide on the guide rods. The rod of the piston carries a stop, which during the release of the workpiece, serves to limit the movement of the jack in such a manner so as to cause the body to move along the guide rods thus enabling the electrodes supported by the body of the jack to be moved away from the work piece.

With reference to FIGS. 1-5, a transformer, generally indicated by reference numeral 1, contains a laminated magnetic circuit 2 formed by a stack of U-shaped plates held in position by a casing 3. Two primary windings 4, adapted to be supplied by a source of alternating current, are positioned on either side of a secondary circuit consisting of a single U-shaped turn 5 as illustrated in FIG. 5.

The transformer of the present invention is manufactured by fitting the casing between two end plates 6 and 7 after two tubular elements 9 and 10 of flat rectangular cross-section have first been placed in position in casing 3. Each tubular element 9 and 10 contains a corresponding flat bar 11 the ends of which terminate in screw-threaded rods 12 and 13, the flat bars being provided to position elements 9 and 10 within the casing. As will be described hereinafter, once the transformer has been assembled, flat bars 11 are removed from the resulting structure to form conduits for accommodating secondary circuit 5. Preferably, elements 9 and 10 are formed from fiberglass and as noted above are intended to provide conduits giving passage to the secondary circuit.

Screw-threaded rods 12 pass through holes 15 provided in a plate 16 of an assembly frame 17 which is adapted to maintain the individual components of the transformer 1 in the desired spacial relationship during assembly. To one end of the threaded rods 12 are affixed nuts 20 adapted to secure the threaded rods 12 to the plate 16.

The assembly plate 17 comprises a base 19 from which ascends a side plate 18 adapted to be removably affixed to the end plate 7 by a suitable fastening means such as screws 21 which are inserted in corresponding threaded holes provided in the plate 7 as illustrated in FIG. 2. Plate 16 is likewise fixed to side plate 18 by screws 22 which pass through holes in plate 18 and are screwed in tappings of the plate.

Base 19 comprises a shoulder 26 as seen in FIG. 1, which comes to rest on a level with an aperture 27 formed through the plate 6; the shoulder 26 having holes 29 through which the threaded rods 13 pass, the rods being adapted to receive nuts 30. Additionally, plate 6 is provided with oblique blind holes 31 intended to secure the device in an assembled condition as will be described in detail hereinafter.

In order to provide adequate cooling for transformer 1, end plate 6 is provided, on the inward surface which faces toward the windings 4, with a hole 35 intended to receive a socket 36 of cooling tube 39 while on the opposite side of plate 6, a blind hole 37 is formed to accommodate an end 38 of a cooling tube 40. End 38 includes a tapped hole into which is inserted a screw 41 which passes through a corresponding hole provided in plate 18 as illustrated by FIG. 2.

Cooling tube 39 is provided, at the end opposite to that bearing socket 36, with a socket 42 which is inserted into a hole 43 formed in end plate 7. Cooling tube 40 includes an end 45 having a lateral tapped hole 46 for receiving a screw 21.

Plate 7 is provided with a wide aperture 47 adapted to allow for the insertion of the secondary circuit into the transformer. Similar to end plate 6, end plate 7 is provided with a set of oblique, blind holes 48 in order to provide a securing system.

When all the elements of transformer 1 have been assembled and accommodated inside casing 3, the combination is secured to the assembled frame 17 and an epoxy introduced through aperture 101 of plate 16 thus filling up all the free spaces defined by plates 6 and 7, the casing 3 and the plates 16 and 19. This resin firmly secures each end of plates 6 and 7 by penetrating oblique blind holes 31 and 48 formed in end plates 6 and 7, respectively.

Once the resin has set, a transformer is produced in which all the elements are connected and insulated electrically so as to provide an extremely rigid monolithic structure.

After the resin has hardened, transformer 1 is removed from assembly frame 17 by unscrewing screw fasteners 21, 22 and 41. Nuts 20 and 30 are then removed from the screw-threaded ends of flat bars 11. Thus, flat bars 11 are released and removed from the interior of the transformer construction thereby forming two parallel conduits or channels of flat rectangular cross-section designed to accommodate the limbs of secondary circuit 5.

Secondary circuit 5, as illustrated by FIG. 5, comprises a copper bar of flat rectangular cross-section having a generally U-shaped configuration in order to present a pair of parallel limbs or legs 49 and 50; respectively, interconnected by a web 51. This secondary circuit 5 is tubular in construction, the free ends of the limbs being provided with holes 52 and 53, respectively, adapted to accommodate clamps 54 and 55. Each clamp 54 and 55, as illustrated in FIG. 6, is connected to a cooling water circuit by means of fluid conduits 56 and 57, respectively.

Clamp 54 is connected by a bar 68 to a branch 61 supporting a welding electrode 62. Branch 61 includes two fluid conduits 80 and 81 adapted for connection to a cooling circuit, the branch 61 containing, in its interior, channels which communicate with fluid conduits 80 and 81 and which extend to a point in the vicinity of electrode 62.

Clamp 55 is connected by a flexible electrically conducted braid 67 to an electrode 66 carried by rod 65 of piston 69 of pneumatic jack 64. Electrode 66 is connected to piston rod 65 of jack 64 by an electrode holder 83 provided with two fluid conduits 84, only one of which is visible in FIG. 6.

As seen in FIG. 6, fluid conduits 85 and 86 are mounted on sockets 36 and 42, respectively, of cooling tube 39. Fluid conduit 85 is connected to a feed pipe providing a source of cooling fluid, while fluid conduit 86 is adapted to be connected, by a flexible tube, to fluid conduit 57 of the secondary circuit 5. The cooling fluid circulates through the secondary circuit and emerges from fluid conduit 56, this latter conduit being connected by a flexible tube to fluid conduit 80 for cooling electrode 62. Fluid conduit 81 is connected to one of the fluid conduits 84 of electrode holder 83 while the other fluid conduit 84 is connected by a flexible tube to socket 46. Thus, the cooling fluid passes through the transformer via tube 40 and is discharged through socket 38.

As is best illustrated in FIGS. 6 and 7, the external secondary winding guide means includes an arm 63, integral with the body of the pneumatic jack 64, which is rigidly affixed, suitably insulated, to branch 61. Support 71 is attached to lower end plate 7 of transformer 1 which positions two jack body guide rods or bars 70. These guide rods are fixed in position and adapted to receive slides 72 and 73 integral with the body of jack 64. A traction spring 75 is inserted between the upper end plate 7 of transformer 1 and the slide 72 in order to facilitate easier upward movement of the body of jack 64.

The welding apparatus according to the present invention is particularly simple in its construction and offers a large number of advantages, particularly when used in connection with industrial robots and the like.

The welding apparatus according to the present invention is very compact, the secondary shunt circuit being short and situated outside of the transformer, so that the impedance is comparatively small and the apparatus can be removed and replaced without difficulty. As a result, a very considerable savings of electrical energy is also obtained.

The secondary circuit utilizes a U-shaped part made of electrolytic copper having a flat rectangular cross-section providing satisfactory electrical coupling between the primary and secondary circuits of the transformer. Additionally, the machining of this component is very simple and therefore reduces the overall cost of the apparatus.

Since the secondary circuit does not have to be guided in transformer 1, the transformer need not be disassemblable. This permits the use of an epoxy resin as a binding agent for fixing the various components of the transformer which enables a reduction in weight and size thus further adapting the present invention for use with industrial robots.

The operation of the apparatus of the present invention is best illustrated with reference to FIGS. 7-9.

Bars 70 are fixed in position and form a guiding system for slides 72 and 73 integral with the body of jack 64. Arm 63, as described above, is integral with limb 50 of secondary winding 5 as well as with the body of jack 64. Thus, the movements of the body of jack 64 over rods 70 are accurately guided and since the combination of the body of jack 64 and winding 5 is rigid, no guiding device is required inside the transformer.

The welding operation is initiated by admitting fluid, via the fluid conduits seen in FIG. 6, into the cylinder of jack 64 on that side corresponding to the head of piston 69. As the pressure inside the cylinder 64 increases, piston 69 moves in the direction illustrated by arrow A until electrode 66 comes to rest against workpiece 100. In this position, piston 69 can no longer move in a downward direction and as the cylinder of the jack 64 is slidably mounted on bar 70, it moves in an upward direction as shown by arrow B thus clamping the workpiece 100 between electrodes 62 and 66.

After the welding has been completed, the direction of feed of jack 64 is reversed and fluid is admitted from that side corresponding to the rod of piston 69. Piston 69, then moves, as illustrated in FIG. 8, in an upward direction indicated by arrow C until stop 76 abuts against the lower end of rod 70. As piston 69 can no longer move, and fluid under pressure is still admitted into the cylinder of jack 64, the jack moves in a downward direction, as illustrated by arrow D of FIG. 9. This causes branch 61 rigidly connected to the body of jack 64 by arm 63 to move in a downward direction facilitating the release of the workpiece 100 and facilitating the insertion of an additional workpiece.

As indicated above, secondary circuit 5, by means of limb 50 which is rigidly connected to the body of jack 64 by arm 63, accurately follows the movement of the body of the jack 64.

While the invention has been particularly shown and described with reference to preferred embodiments thereof, it is understood by those skilled in the art that various changes in form and detail may be made therein without departing from the spirit and the scope of the invention as defined in the appended claims.

What is claimed is:

1. Apparatus comprising:
   (a) a tubular casing having an open top and bottom;
   (b) first and second end plates for closing the open ends of said casing;
   (c) a primary winding positioned in said casing;
   (d) a magnetic circuit operatively positioned relative to said primary winding within said casing;
   (e) means for clamping said magnetic circuit and said primary winding in said case including a binding agent which is poured into said casing to fill up all free spaces defined by said end plates and to assemble said apparatus;
   (f) a pair of spaced parallel recesses in said binding agent formed by the process of positioning a pair of tubular elements within said casing adjacent said primary winding before said binding agent is poured into said casing, pouring said binding agent into said casing, and removing said pair of tubular elements; and
   (g) a secondary winding having a pair of spaced, parallel legs slidably mounted in said recesses in said binding agent formed by the removal of said tubular elements.

2. Apparatus according to claim 1 wherein a first welding electrode is rigidly attached to one leg of said secondary winding, and a second welding electrode is flexibly attached to the other leg of said secondary winding.

3. Apparatus according to claim 2 wherein said secondary winding is tubular and contains a heat transfer fluid.

4. A method of welding a workpiece with a welding apparatus having a transformer having a U-shaped secondary winding movable therein, and first and second electrodes each being electrically connected to one of the legs of the secondary winding; the method comprising the steps of:
   (a) moving the first electrode towards the workpiece so as to contact the same, the first electrode being flexibly connected to one leg of the secondary winding;
   (b) moving the second electrode towards the workpiece so as to contact the same, the second electrode being rigidly connected to the other leg of the secondary winding whereby the secondary winding within the transformer is guided by the movement of the secondary electrode; and
   (c) effecting the weld.

5. The method according to claim 4, further comprising the step of moving the first electrode away from the workpiece after the weld is effected.

6. The method according to claim 5, further comprising the step of moving the second electrode away from the workpiece after the first electrode is removed therefrom.

7. The method according to claim 4, wherein the welding apparatus includes a jack having a jack body and piston adapted for movement relative to one another, the jack body being movably mounted externally to the transformer on guide rods, the first electrode being connected to a piston rod of the piston, the piston rod carrying a stop adapted to abut the guide rods, and the second electrode being rigidly attached to the jack body, the jack being adapted for feeding a fluid into and out of the jack on either side of the piston, the method comprising the steps of:
feeding the fluid into the jack on that side of the piston opposite the piston rod so as to move the first electrode towards the workpiece until the first electrode contacts the workpiece; and
continuing to feed the fluid into the jack so that the jack body is moved away from the workpiece and the second electrode, rigidly attached to the jack body, moves toward the workpiece to firmly clamp the workpiece between the electrodes for welding.

8. The method according to claim 7, further comprising the step of reversing the feed of fluid into the jack after the welding step.

9. The method according to claim 7 wherein the step of moving the first electrode away from the workpiece comprises the step of feeding the fluid into the same side of piston as the piston rod until the stop on the first electrode abuts the guide rods.

10. The method according to claim 9 wherein the step of moving the second electrode away from the workpiece comprises the step of continuing to feed the fluid into the jack after the stop has abutted the guide rods whereby the jack body moves toward the workpiece so as to move the second electrode away from the workpiece.

11. The method according to claim 4 further comprising repeating the method.

12. Resistance welding apparatus comprising:
(a) a casing on which is mounted a stationary primary winding for a connection to a source of alternating current;
(b) a U-shaped secondary winding having a pair of spaced apart legs, said secondary winding being magnetically coupled to said primary winding and mounted for movement relative thereto;
(c) an actuatable fluid operated jack having a cooperable piston and cylinder movable relative to each other and to said casing;
(d) a first welding electrode on said cylinder and a second welding electrode on said piston for clamping a workpiece therebetween;
(e) a flexible conductive shunt connecting one leg of said secondary winding to said second electrode; and
(f) a rigid conductive connector connecting the other leg of said winding to said first electrode.

13. The welding apparatus according to claim 12, wherein said second winding is tubular for receiving a heat transfer fluid.

14. Resistance welding apparatus according to claim 12 wherein said second winding comprises a bar of flat rectangular cross section.

15. Resistance welding apparatus according to claim 12 including a pair of guide rods parallel to each other and to the legs of said secondary winding, means on said cylinder cooperable with said guide rods for slidably mounting said cylinder on said casing, and a stop on said casing cooperable with said piston when the latter reaches a predetermined position for limiting movement of the piston in one direction such that the cylinder is caused to move in the opposite direction enabling the said second electrode to move away from the workpiece.

16. Resistance welding apparatus according to claim 15 including a pair of tubular elements mounted on said casing for receiving the legs of said secondary winding.

17. Resistance welding apparatus according to claim 12 wherein said casing includes a tubular housing having axial end plates, and said primary winding comprises a pair of coils and a plurality of laminates magnetically coupled to said coils contained in said housing, and a binding agent for retaining the coils and laminates in fixed spatial relationship in said housing.

18. The apparatus according to claim 17, wherein one of said end plates is formed with an aperture which allows for the insertion and removal of said secondary winding with respect to said transformer.

19. Resistance welding apparatus comprising;
(a) a casing in which is mounted a stationary primary winding;
(b) a rigid secondary winding magnetically coupled to said primary winding and mounted for movement relative thereto;
(c) a fluid actuated cylinder containing a piston that moves in response to pressurization of the fluid;
(d) means mounting said cylinder on said casing for movement relative thereto;
(e) a first electrode rigidly connected to said piston and having a flexible conductor connected to one end of said secondary winding;
(f) a second electrode rigidly connected to said cylinder and to the other end of said secondary winding; and
(g) stop means on said piston cooperable with stop means on said casing for limiting movement of said piston in one direction.

20. A method for welding a workpiece using apparatus comprising a casing in which is mounted a stationary primary winding; a rigid secondary winding magnetically coupled to said primary winding and mounted for movement relative thereto; a fluid actuated cylinder containing a piston that moves in response to pressurization of the fluid; means mounting said cylinder on said casing for movement relative thereto; a first electrode rigidly connected to said piston and having a flexible conductor connected to one end of said secondary winding; a second electrode rigidly connected to said cylinder and to the other end of said secondary winding; and stop means on said piston cooperable with stop means on said casing for limiting movement of said piston in one direction, said method comprising the steps of:
(a) pressurizing one side of said cylinder when said stop means on said piston and on said casing are in cooperation for effecting movement of said piston in a direction opposite to said one direction whereby said first electrode moves toward said second electrode into engagement with said workpiece when the latter is inserted between said electrodes;

(b) continuing pressurization of said one side of said cylinder after said workpiece is engaged by said first electrode for effecting movement of said cylinder relative to said workpiece until the second electrode clamps said workpiece to said first electrode;

(c) applying a welding pulse to said primary winding for effecting a spot weld of said workpiece;

(d) pressurizing the opposite side of said cylinder to effect movement of the piston relative to the cylinder and disengagement of said first electrode from said workpiece until the stop means on said piston operatively engages the stop means on said casing; and (e) continuing pressurization of said opposite side of said cylinder to effect movement of said cylinder relative to said casing whereby the workpiece is disengaged from said electrodes.

* * * * *